United States Patent Office 3,047,579
Patented July 31, 1962

3,047,579
PROCESS FOR PREPARING N-OXIDES
Robert C. Witman, Westfield, N.J., assignor to Shell Oil Company, a corporation of Delaware
No Drawing. Filed July 18, 1958, Ser. No. 749,345
8 Claims. (Cl. 260—289)

This invention pertains to a process for the preparation of N-oxides—that is, amine oxides. More particularly, this invention provides a novel, improved process for the preparation of N-oxides of tertiary organic bases—i.e., tertiary amines.

The N-oxides are a class of compounds of which various members have been found to have properties which make them useful for a wide variety of purposes. Thus, the halo-pyridine N-oxides have been found to be effective fungicides, as have the N-oxides of the nitrogenous condensation products of methylol-forming phenolic compounds, formaldehyde and aliphatic secondary amines. These latter N-oxides also have been found to be of value as moth-proofing agents, and as bactericides, as finishing agents for textiles, as water-proofing agents for textiles, and for rendering textiles more receptive to dyes. Also, the N-oxides of heterocyclic bases, such as the phenanthrolines, quinoxalines, quinolines, isoquinolines and pyridines, have been found to have valuable therapeutic properties and low mammalian toxicity. N-oxides also have been found to be useful as stabilizers for unsaturated compounds such as styrene, and as wetting agents, washing agents, cleaning agents, emulsifying agents, and for other uses which involve modification of the surface properties of aqueous media. Many of the N-oxides also are of interest as raw materials for the preparation of other valuable compounds.

It has been proposed that the N-oxides be prepared by reacting a tertiary amine with perbenzoic acid, peroxyacetic acid or like organic per-acids, in an organic solvent. However, such organic per-acids are highly unstable, so that they must be prepared freshly just before use, and great caution must be exercised in their use to prevent their detonation. Further, these organic per-acids are expensive to prepare and use. Consequently, processes involving the use of such acids are not feasible for the large-scale preparation of N-oxides.

It also has been proposed that the N-oxides be prepared by reacting a tertiary amine with hydrogen peroxide in an aqueous reaction medium. This method likewise is not feasible for the large-scale production of N-oxides because the reaction times involved are much too long.

To overcome the shortcomings of such processes, it has been proposed that the reaction of a tertiary amine with hydrogen peroxide be carried out in the presence of particular reaction media, particularly oxygen-containing organic liquids such as lower carboxylic acids (glacial acetic acid in particular) and lower ketones (acetone in particular).

These latter proposals have not provided any satisfactory method for preparing N-oxides, inasmuch as the effectiveness of the use of particular solvents in effecting the oxidation of the amine to the N-oxide varies greatly from case to case. Thus, in some cases, the use of an oxygen-containing organic solvent results in efficient oxidation of the amine, while in other cases such a solvent is wholly ineffective in promoting the oxidation of the amine.

I have now discovered that tertiary amines, as a class, are easily and efficiently oxidized to the corresponding N-oxides by reacting those amines with hydrogen peroxide in the presence of unstable inorganic per-compounds of acid-forming elements of groups VA, VIA, VIB and VIII of the periodic table, as catalyst. My new process efficiently effects the oxidation of the N-oxides of all of the tertiary amines which are known to oxidize to the corresponding N-oxides, and in fact my new process is applicable generally to the oxidation of all tertiary amines to the corresponding N-oxides. Since my new process employs only stable, easily handled materials, relatively inexpensive, re-usable catalysts, and gives much higher reaction rates than have heretofore been possible, it lends itself admirably as a general method for the large-scale preparation of N-oxides. The new process also effects much more efficient use of hydrogen peroxide.

Any tertiary amine in which the amino nitrogen atom is the primary reactive moiety is oxidized to the corresponding N-oxide by my new process. Suitable amines thus include the tertiary amines in which the groups directly bonded to the amino nitrogen atom are hydrocarbon groups, and those in which the groups directly bonded to the amino nitrogen atom are substituted-hydrocarbon in character. The groups bonded to the amino nitrogen atom may be aliphatic or aromatic in character. The aliphatic groups may be of branched-chain or of straight-chain configuration, or they may be cyclic in character; they may be saturated, or they may be olefinically unsaturated. Actylenically unsaturated aliphatic groups preferably are excluded, since the acetylenic linkage in some cases may interfere with the necessary reactivity of the amino nitrogen atom. The amino nitrogen atom may form a part of a heterocyclic ring, and in such cases, the remaining atoms of the ring may be only carbon atoms, or they may be such atoms as the oxygen atom, the sulfur atom, metal atoms or semi-metal atoms. The suitable tertiary amines may be homogeneous in character—all of the groups bonded to the amino nitrogen ring being similar in character—or they may be heterogeneous in character—i.e., mixed amines wherein two or more of the groups bonded to the amino nitrogen atom are dissimilar in character.

Suitable amines thus include those wherein the groups bonded to the amino nitrogen atom are alkyl, aryl, aralkyl, alkaryl, alkenyl, alkenyl-aryl, aralkenyl groups—i.e., hydrocarbon groups—or alkylol, haloalkyl, haloaryl, hydroxyaryl, haloalkaryl, haloaralkyl, haloalkenyl or like substituted-hydrocarbon groups.

Examples of the suitable types of tertiary amines include the trialkyl amines such as trimethyl, tributyl, trioctyl, methyl diethyl, isopropyl diamyl, pentyl methyl butyl and like amines, alkylol amines such as triethanolamine, triisopropanolamine, and the like, mixed alkyl alkylol amines, such as diethyl ethanolamine, aryl amines such as triphenylamine, mixed alkyl aryl amines such as dimethyl aniline, aralkyl amines such as tribenzylamine, alkaryl amines such as tri-p-tolylamine, mixed, allyl diethylamine, phenyl ethyl allylamine and the like, halogen-substituted hydrocarbon amines such as tris(beta-chloroethyl)amine, beta-chloroethyl dimethylamine, tribromomethyl diethylamine, phenyl beta, beta-dichloroethylamine, tris(p-chlorophenyl)amine, p-bromophenyl dihexylamine, and the homologs and analogs of such amines. Suitable amines of interest because of the properties of the corresponding N-oxides are the trialkylamines containing up to 35 carbon atoms, and particularly such amines wherein one of the alkyl groups is a long-chain alkyl group of from 8 to 20 carbon atoms (such as the capryl, lauryl, cetyl, stearyl or octadecenyl groups) and the other two alkyl groups are lower alkyl groups of up to 6 carbon atoms each, or those other two alkyl groups form a single alkylene group, as in the piperidine or pyrrolidine rings. Suitable amines also of interest because of their amine oxides are the tertiary amines of the formula (R)(R')(R")N, wherein R is a hydroaromatic moiety, or wherein R is an alkyl group of up to 20 carbon atoms bonded to the nitrogen atom by an oxyalkylene (—O-alkylene-) group, by an amidoalkylene (—C(O)NH-alkylene-) group, or by an aromatic nucleus such as the phenyl nucleus. Still another group of N-oxides of interest are those derived from amines of the structure

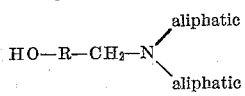

wherein R is an aromatic or substituted-aromatic nucleus, this class of compounds being condensation products of methylol-forming phenolic compounds, formaldehyde and aliphatic secondary amines described in United States Patents Nos. 2,031,557, 2,033,092, 2,036,916, 2,045,517 and 2,220,835. The precise nature of such amines and detailed descriptions thereof is set out in the last-mentioned of this series of patents.

A particularly wide variety of properties are exhibited by the N-oxides of heterocyclic bases wherein the amino nitrogen atom is one member of the heterocyclic ring, any valence bond of the trivalent nitrogen atom not involved in the ring being satisfied by a hydrocarbon group, or a halo- or hydroxy-substituted hydrocarbon group as set out hereinbefore. Preferably, the amines from which such N-oxides are prepared contain not more than about 35 carbon atoms, the heterocyclic moiety containing not more than about 20 carbon atoms. Heterocyclic amines wherein the heterocyclic ring involves only nitrogen, carbon, oxygen and sulfur atoms, and any substituent group or groups is(are) hydrocarbon, preferably lower alkyl or phenyl, halogen or hydroxyl are preferred. These amines suitably may contain but one, or they may contain two or more amino nitrogen atoms, and may contain one, or they may contain two or more hetero rings, one or more than one amine nitrogen atom being present in each ring.

Typical of such heterocyclic N-oxides are those derived from such heterocyclic amines as pyridine and the various substituted pyridines, such as the alkyl-substituted pyridines, including both the N-substituted hydropyridines (dihydro-, tetrohydro- and hexahydropyridines), and the C-substituted pyridines such as the picolines, lutidines, collidines and parvolines, phenylpyridine, pyridyl-pyridines, halo-substituted pyridines, such as chloropyridine, dibromopyridine, and the like, quinoline and its substitution products, isoquinoline, hydroxyquinoline, and the various hydroquinolines and their substitution products, phenanthrolines and their substitution products, the quinoxalines, and other pyrazines, such as pyrimidine, pyrazine and the like. Specific examples of other suitable tertiary amines in the preparation of N-oxides by the process of this invention include 2-azirine, N-substituted 2-aziridines, 1,3-diazete, uretine, N-alkyl uretines, 1-alkyl-, 3-alkyl-, and 1,3-dialkyl-1,2-diazetidines, N- and N,N'-substituted piperazines, azete, N-alkyl azetines, N-alkyl acetidines, oxazole, N-alkyl oxazolines, N-alkyl oxazolidines, 1-alkyl-imidazoles, 1-alkyl-, 3-alkyl- and 1,3-dialkyl dines, 1-alkyl-imidazoles, 1-alkyl-, 3-alkyl- and 1,3-dialkyl-imidazolines, the corresponding alkyl-substituted imidazolidines, N-alkyl azepines, N-alkyl azocycloheptanes, isoazepine and Δ'-hexamethyleneimine, 1-alkyl-, 5-alkyl- and 1,5-dialkyl-1,5-diazacyclooctanes, 1-alkyl-1,4-diazonines, N-alkyl azacyclooctanes, azocine, N-alkyl azocyclononanes, 1-alkyl-, 4-alkyl- and 1,4-dialkyl-1,4-diazocyclodecanes, the various N-alkyl substituted 1,3-, 1,4- and 1,6-diazacyclohendecanes, and the various N-alkyl-substituted 1,2-, 1,4-, and 1,7-diazacyclododecanes, 2- and 4-isomidazoles, the various N-alkyl-substitution products thereof, the various N-alkyl pyrroles, pyrrolines and pyrrolidines, 2-pyrrolenine, 3-pyrrolenine, 1,3,5-dioxazine, 1,3,5,2-oxadiazine, 1,3,5,2-thiadiazine, 1,3,2-oxazine, 1,3,4-oxazine and their thia analogs, pentoxazoline and N-alkyl pentoxazolidines, the N-alkyl homomorpholines, the various isomeric oxadiazepines, triazepines, oxazepines and their thia analogs, and the N-alkyl substitution products, N-alkylindoles, N-alkyl pseudoindoles, N-alkyl isoindoles and pseudoisoindoles, 4-quinolizine, the N-alkyl 2-benzazocines, the N-alkyl 7,8-benzoheptamethylenimines, the N-alkyl cyclopenta(b)-pyrroles, and the corresponding (c)-pyrroles, the N-alkyl nortropanes, the N-alkyl 1,4- and 1,6-pyrrolopyridines and 5-pyrindoles, the N-alkyl oxazolo(5.4-b)pyridines, the various isomeric diazacyclolong-chain cycloalkyls, such as 1,15-diazacyclotriacontane, the various isomeric tetrazocyclo-long-chain cycloalkyls, such as 1,4,8,11-tetrazotetradecane, the N-alkyl-1-azapiro(2.4)heptanes, (2.5)octanes and the like, conidine, and other similar tertiary heterocyclic amines.

According to the process of this invention, the tertiary amine is oxidized to the corresponding N-oxide by reacting the amine with hydrogen peroxide in the presence of a catalyst consisting of an unstable inorganic per-compound of an acid-forming element of groups VA, VIA, VIB and VIII of the periodic table. These catalysts are provided by the oxides and/or acids of the specified elements and acid salts of those acids, which oxides, acids or acid salts form inorganic peracids or acid salts of inorganic peracids (persalts) in the reaction zone. Although the actual catalysts are the per-compounds of the acid-forming elements of groups VA, VI and VIII, these catalysts are actually formed in situ in the reaction zone from the oxides, acids or acid salts of those elements. Herein, for brevity, the source oxides, acids or acid salts also will be termed "catalysts." Any of the oxides, acids and acid salts of the acid-forming elements of groups VA, VI and VIII of the periodic table which are known to be effective in promoting hydroxylation of ethylenic compounds by hydrogen peroxide are suitable as catalysts in the present process. Thus, acids, salts of acids, or oxides which react readily with hydrogen peroxide to form peracids can be used. Oxides and acids of the acid-forming elements of group VI of the periodic table are a particularly useful class of catalysts. These oxides may be used as such, as may the acids themselves be used, or the acids or oxides may be converted to the salts, preferably acid salts, or partial salts, thereof particularly the alkali metal or ammonium salts thereof. Alkaline earth metal and other salts of these acids likewise may be used, though they are somewhat less effective in some cases. Also, there may be used the heteropoly forms of the acids of the acid-forming elements of group VI of the periodic table. Heteropoly acids of this kind which are suitable as catalysts in the process of this invention and methods for their preparation are set out in detail in United States Patents Nos. 2,754,325 and 2,773,909. For the purpose of brevity without sacrifice of detail, the portions of U.S. 2,754,325 and U.S. 2,773,909 describing the heteropoly acids of the acid forming elements of group VI of the periodic table are hereby incorporated into and made a part of the disclosures of this specification. Of all of these catalysts, the oxides, acids and acid salts of tungsten have proven to be the most useful due to their selectivity—i.e., their ability to promote the desired oxidation of the amine to the N-oxide with a minimum of undesirable side reactions—and to their high level of activity. Preferred catalysts therefore are those which are based on tungsten, including tungstic oxide, tungstic acid, and the polytungstic acids, including both the homopolytungstic acids and the heteropolytungstic acids, and the salts of such acids, particularly the acid salts, including tungstic acid and the acid tungstates, borotungstic acid and borotungstates, chromotungstic acid and chromotungstates, phosphotungstic acid and phosphotungstates, selenotungstic acid and selenotungstates, and the like.

As a general rule, an amount of the catalyst between about 1.0% and about 20%, based on the number of moles of amine reactant charged, will effectively catalyze the reaction between the amine and the hydrogen peroxide. In many cases, even less of the catalyst—e.g., as little as 0.1% of the amine on a molar basis—will be sufficient, while in most cases it will be found that little additional advantage over the use of lesser amounts of the catalyst are realized by using an amount of catalyst in excess of about 30% of the number of moles of amine charged.

The hydrogen peroxide employed may be in the form of an anhydrous gas, or liquid or it may be in the form of an aqueous solution containing from about 10% to about 90% by weight of hydrogen peroxide. Particularly useful are the commercially available aqueous solutions containing from about 35% to about 70% by weight of hydrogen peroxide. It is preferable that the highest practical concentration of hydrogen peroxide consistent with safe handling be employed because the presence of higher concentrations of hydrogen peroxide in the reaction mixture depresses the formation of side products and results in the formation of higher yields of the desired N-oxide product. For the same reason, while it is quite feasible to employ stoichiometric quantities of the hydrogen peroxide relative to the amine reactant—i.e., one mole of hydrogen peroxide per mole of amine—it is desirable that the hydrogen peroxide be present in the reaction zone in an amount somewhat in excess of the theoretical amount. The excess of hydrogen peroxide need not exceed about 100%, and in most cases an excess of hydrogen peroxide of about 50% will be found sufficient for the desired purpose. At least a 10% excess of hydrogen peroxide should be provided.

The oxidation of the amine can be carried out at atmospheric, superatmospheric or subatmospheric pressure, as may be desirable. In the great majority of cases, it will be found that operation at substantially atmospheric pressure will be found to be most convenient. Preferred temperatures for effecting the reaction are of the order of from about 40° C. to about 80° C., temperatures of from about 50 to 60° C., being generally most useful. A temperature of at least about 25° C. will generally be found necessary to obtain practical reaction rates. In most cases, little advantage will be obtained through the use of temperatures in excess of about 100° C., as compared to the use of somewhat lower temperatures. Under these conditions of temperature and pressure, reaction times of the order of from about one-half hour to about ten hours will be found sufficient to effect the desired reaction to completion.

In many cases, the reaction of the amine and the hydrogen peroxide is most effectively carried out in a liquid phase reaction medium, using a solvent in which the hydrogen peroxide, and preferably also the catalyst, are substantially soluble. In the case where the hydrogen peroxide is supplied as an aqueous solution, the solvent preferably also should be miscible with water. It is desirable that the solvent employed be substantialy inert with respect to hydrogen peroxide under the conditions employed. Where the amine is an aliphatic amine in which the amino nitrogen atom is not a part of a heterocyclic ring, such non-acidic solvents as the oxygenated organic liquids such as alcohols, hydroxy ethers, ketones and the like can be used effectively. While any of the alcohols can be used for the purpose, it is preferred to use the lower alkanols substantially miscible with water—for example, the alkanols of up to about five carbon atoms. Tertiary butyl alcohol has been found particularly useful. Suitable hydroxy-ether solvents include, for example, the ethylene glycol and diethylene glycol monoethers, particularly the ethyl ethers. Dioxolane, dimethyl formamide and sulfolane are other types of solvents which can be successfully used. Lower aliphatic ketones, however, have proven to be particularly effective. Of these the ketones of up to about six carbon atoms, and particularly dimethyl ketone and methyl ethyl ketone, have been found of marked usefulness.

Where the amine reactant involves an aromatic group, or is a heterocyclic amine in which the amine nitrogen atom is a part of the hetero ring, it has been found that the most useful solvents are the lower aliphatic monocarboxylic acids. These acids also are quite useful in the case of the aliphatic tertiary amines. Suitable acids are those containing up to about six carbon atoms. Of these, acetic acid and propionic acid are the most useful, glacial acetic acid being preferred because of its wide availability at low cost.

The amount of the solvent used is not critical. In general, sufficient solvent should be employed to dissolve the intended solutes and to provide a readily fluid reaction mixture. Generally a weight of solvent amounting to at least the weight of the amine reactant is required, and in most cases at least twice this amount of solvent is desirable. Usually, not more than about five to ten times the weight of the amine reactant of solvent need be used. In most cases a weight of solvent of from about 3 to about 6 times the weight of the amine reactant is most convenient.

It will be noted that as shown in Example II, set out hereinafter, it is not always necessary, and in many cases is convenient and desirable, to conduct the reaction of the amine with the hydrogen peroxide without an added solvent being present, since this avoids the cost of the solvent and in many cases simplifies recovery of the N-oxide product.

In conducting the reaction of the amine and the hydrogen peroxide, it is desirable that the reactants be brought together slowly, and not all at once. The order in which the reactants are introduced into the reaction mixture is not critical. In most cases, it will be found most desirable that the amine reactant be mixed with the catalyst (and solvent, if one is used) and the hydrogen peroxide added slowly to the stirred reaction mixture, the reaction temperature being controlled by heating or cooling as necessary. This is not to say that the reverse order of mixing may not be used. However, addition of the hydrogen peroxide to the amine is the preferred technique, since it permits better control of the reaction and minimization of undesired by-products.

It is desirable that the reaction mixture pH be maintained at 7 or less—that is, alkaline reaction mixtures are preferably avoided—since the hydrogen peroxide tends to decompose in alkaline solution without forming useful product. Preferably the reaction mixture is slightly to moderately acid. This acid condition is provided, of course, where a lower monocarboxylic acid is used as solvent. It also is attained where the catalyst is an acid, and especially where the acid used as catalyst is soluble in the reaction mixture.

In some cases, where there is encountered a tendency for decomposition of the hydrogen peroxide, the decomposition of the hydrogen peroxide can be reduced by the addition of a small amount of a chelating agent, such as ethylene diaminetetraacetic acid or other aminopolycarboxylic acid, or salt thereof.

In the great majority of cases, when the disclosed proportions of hydrogen peroxide and amine are employed, the hydrogen peroxide will be consumed in the reaction and/or any excess will be decomposed in the reaction mixture, so that no problem of removing unreacted hydrogen peroxide from the reaction mixture is presented. In a few cases, however, as where a large excess of hydrogen peroxide is used, there may be excess hydrogen peroxide present in the reaction mixture and it may not be convenient or desirable to continue the reaction until all of the excess hydrogen peroxide has been decomposed. In such cases, the excess hydrogen peroxide is decomposed by conventional methods, such as addition of platinum black or other hydrogen peroxide decomposition catalyst, and/or by addition of a strong base, such as sodium hydroxide, followed by heating as necessary to decompose the excess hydrogen peroxide. The presence or absence of hydrogen peroxide in the reaction mixture can be ascertained by analyzing small portions of the mixture by Kingzett's iodide method (employing potassium iodide and sodium thiosulfate), Furman, "Scott's Standard Methods of Chemical Analyses," 8th edition, 1939, at page 2180.

The catalyst is removed from the final reaction mixture by one or two general techniques, the particular technique used being dependent upon whether or not the catalyst is soluble in the reaction mixture. If the catalyst is insoluble, it can be removed by filtration, centrifugation or similar techniques. If the catalyst is soluble, it is best removed by extraction of the reaction mixture with a suitable selective solvent, which in many cases may be a lower aliphatic ether, such as diethyl ether. The technique for removal of the catalyst may also depend upon the technique by which the N-oxide product is recovered. In any case, the catalyst normally can be reused without further treatment. In some cases, it will be found that the catalyst is insoluble, but that the particles thereof are of colloidal dimensions, so that removal of the catalyst by filtration or centrifugation is difficult. In such cases, removal of the catalyst is more easily accomplished by treating the reaction mixture containing the catalyst with an alkaline earth metal base, such as calcium hydroxide preferably in solution in water, the amount of the base being slightly in excess of the stoichiometric amount required to react with all of the acidic catalyst. The mixture is stirred for about 30–90 minutes, preferably while cooling from reaction temperature down to room temperature. The base reacts with the acidic catalyst, the resulting salt being stable and easily coagulated and removed by filtration and/or centrifugation techniques. The catalyst is recovered for re-use by springing the acid from the salt.

The N-oxide product can be recovered from the catalyst-free mixture in a number of ways. In cases where anhydrous hydrogen peroxide was used, and no solvent was used, or in cases where aqueous hydrogen peroxide was used, and no solvent was used, the product N-oxide may often be recovered by simply distilling off the water of reaction and water introduced with the hydrogen peroxide. Where a solvent was used, in many cases the solvent too may be removed by distillation. It must be noted that in a great many cases the N-oxide product is somewhat unstable, so that distillation of the water or water and solvent must be accomplished at such a low pressure that the N-oxide product is not decomposed. It has been found that in a great percentage of cases, the hydrohalide (e.g., hydrochloride) of the N-oxide is more stable than is the N-oxide itself. In such cases, the N-oxide is best recovered by first converting it to the hydrohalide, then removing water or water and solvent. Also, the N-oxide hydrohalides usually are crystalline, whereas the N-oxides are not; conversion of the N-oxide to the hydrohalide thus provides a simple technique for obtaining a pure product by recrystallization techniques.

In some cases, the N-oxide is substantially insoluble in an alkaline aqueous medium. In those cases, the N-oxide may be conveniently recovered by making the crude reaction mixture freed of any solid catalyst alkaline (as by addition thereto of a strong base, such as sodium hydroxide) and separating the insoluble N-oxide from the resulting mixture.

The foregoing constitutes a general description of the process of this invention. The following examples are set out to demonstrate application of the process to the preparation of particular N-oxides from particular amines. These examples are included in this specification only for the purpose of illustrating and exemplifying the invention, and are not to be construed as limiting the invention in any way not recited in the claims of this application. In these examples, "parts" means "parts by weight" unless otherwise specifically indicated.

*Example I*

7.9 parts of pyridine, 30 parts of glacial acetic acid and 2.5 parts of tungstic acid were mixed and the mixture heated to 60° C. and stirred vigorously. 8.2 parts of a solution of 50% by weight hydrogen peroxide in water was added to the stirred mixture over a period of five minutes, the reaction temperature being held at about 60–65° C. The mixture was stirred and maintained at about 60–65° C. for an additional five hours, when all of the peroxide had been consumed (as determined by titration of one milliliter samples of the reaction mixture using the potassium iodide-sodium thiosulfate volumetric technique). The mixture was filtered to remove the catalyst, a 10% excess over the stoichiometric amount of concentrated hydrochloric acid wa added and the acetic acid and water were removed by distillation of the mixture under a pressure of 15–20 millimeters mercury pressure. 11.2 parts of product were obtained. This was an 85% yield.

Repetition of this experiment, substituting 10.1 parts of triethylamine for the pyridine results in approximately the same yield of triethylamine oxide.

*Example II*

5 parts of tungstic acid and 22.7 parts of 2-chloropyridine were mixed and to the mixture was added dropwise over a 5-minute period 23.4 parts of a solution of 35% by weight hydrogen peroxide in water. The mixture was stirred and heated to about 60–65° C. for six hours. Then 23 parts of concentrated hydrochloric acid were added, the mixture was heated on a steam bath for about 15 minutes, was allowed to cool and was filtered to remove the catalyst. The filtrate was evaporated to dryness under 15–20 millimeters mercury pressure. 22.6 parts of the hydrochloride of 2-chloropyridine N-oxide, representing a 78% yield based on the amine reactant, were obtained.

*Example III*

18.6 parts of gamma-picoline, 60 parts of tertiary butyl alcohol, and 5.0 parts of tungstic acid were mixed and stirred vigorously at 60° C. 16.4 parts of 50% by weight hydrogen peroxide in water was added over a five-minute period. The mixture was stirred and heated at 60–65° C. for six hours. At that time all of the peroxide had been consumed. The mixture was filtered to remove the catalyst and the alcohol and water were removed by distillation of the solution under a pressure of 15–20 millimeters mercury pressure. 14.7 parts of the product gamma-picoline N-oxide remained. This represented a 72.5% yield.

*Example IV*

25.8 parts of quinoline, 60 parts tertiary butyl alcohol, and 5.0 parts of tungstic acid were mixed and heated to 60° C. 16.4 parts of 50% by weight hydrogen peroxide was added over a five minute period. The mixture was maintained at 60–65° C. with stirring for an additional 2.5 hours. The N-oxide was isolated as in the above example in a 70% yield (20.3 parts product as the N-oxide).

*Example V*

31.6 parts of pyridine, 20 parts water, and 5.0 parts of molybdic anhydride were mixed together and heated to 60° C. 32.8 parts of 50% by weight hydrogen peroxide was added over a ten minute period. The temperature of the reaction mixture was maintained at 60–65° C. for two hours until all of the peroxide was consumed. 4.0 parts of calcium hydroxide were added and the temperature of the reaction mixture was allowed to cool to room temperature with continued stirring. The insoluble salts were filtered. Fifty parts of concentrated hydrochloric acid were added to the filtrate. The solution then was freed of water by distillation at 10–15 millimeters mercury pressure. 34.3 parts of the hydrochloride salt of the pyridine N-oxide was obtained, representing a 63% yield.

I claim as my invention:
1. A process for preparing N-oxides which comprises reacting:
   (a) a compound of the formula:

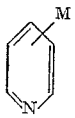

wherein all of the ring substituents except M are hydrogen atoms and M is selected from the group consisting of hydrogen, chlorine, and methyl, and (b) hydrogen peroxide at a temperature of from 40° C. to 80° C. in the presence of a catalytic amount of an inorganic per-compound of an acid-forming element selected from the group consisting of the elements of group VI of the periodic table.

2. A process for preparing the N-oxide of 2-chloropyridine which comprises reacting:
   (a) 2-chloropyridine and (b) hydrogen peroxide at a temperature of from 40° C. to 80° C. in the presence of a catalytic amount of an inorganic per-compound of an acid-forming element selected from the group consisting of the elements of group VI of the periodic table.

3. The process of claim 2 wherein the per-compound is a tungsten compound.

4. The process of claim 2 wherein the per-compound is a tungstic acid compound.

5. A process for preparing the N-oxide of gamma-picoline in a carboxylate-free medium which comprises reacting:
   (a) gamma-picoline and (b) hydrogen peroxide at a temperature of from 40° C. to 80° C. in tertiary butyl alcohol solvent with a catalytic amount of pertungstic acid.

6. A process of preparing the N-oxide of pyridine in a carboxylate-free environment which comprises reacting:
   (a) pyridine and (b) hydrogen peroxide at a temperature of from 40° C. to 80° C. in the presence of a catalytic amount of an inorganic per-compound of an acid-forming element selected from the group consisting of the elements of group VI of the periodic table.

7. The process of claim 6 in which the per-compound is a molybdenum compound.

8. A process for preparing the N-oxide of quinoline which comprises reacting quinoline and hydrogen peroxide in a carboxylate-free environment at a temperature of from 40° C. to 80° C. in the presence of an inorganic per-compound of an acid-forming element selected from the group consisting of the elements of group VI of the periodic table.

References Cited in the file of this patent

UNITED STATES PATENTS

| 2,416,658 | Van Arendonk | Feb. 25, 1947 |
| 2,518,130 | Evans et al. | Aug. 5, 1950 |

FOREIGN PATENTS

| 199,451 | Switzerland | Nov. 1, 1938 |

OTHER REFERENCES

Baxter et al.: Chem. Abstracts, vol. 44, column 8356 (1950).

Jerehel et al.: Chem. Ber., vol. 85, pages 1130–8 (1952).

Culvenor: Chem. Abstracts, vol. 48, column 4432 (1954).